(No Model.)

A. H. BOIES.
CAR COUPLING.

No. 351,090. Patented Oct. 19, 1886.

WITNESSES:
John A. Ellis
C. Sedgwick

INVENTOR:
A. H. Boies
BY Munn & Co
ATTORNEYS.

UNITED STATES PATENT OFFICE.

ALBERT HARTSON BOIES, OF HUDSON, MICHIGAN.

CAR-COUPLING.

SPECIFICATION forming part of Letters Patent No. 351,090, dated October 19, 1886.

Application filed August 19, 1886. Serial No. 211,277. (No model.)

*To all whom it may concern:*

Be it known that I, ALBERT HARTSON BOIES, of Hudson, in the county of Lenawee and State of Michigan, have invented a new and Improved Car-Coupling, of which the following is a full, clear, and exact description.

My invention relates to that class of car-couplings wherein the cars may be coupled and uncoupled without the necessity of entering the space between the approaching cars.

My invention consists in the particular combination and construction of parts which permit of quick and certain action in coupling and uncoupling cars.

Reference is to be had to the accompanying drawings, forming a part of this specification, in which similar figures of reference indicate corresponding parts in both views.

Figure 1:
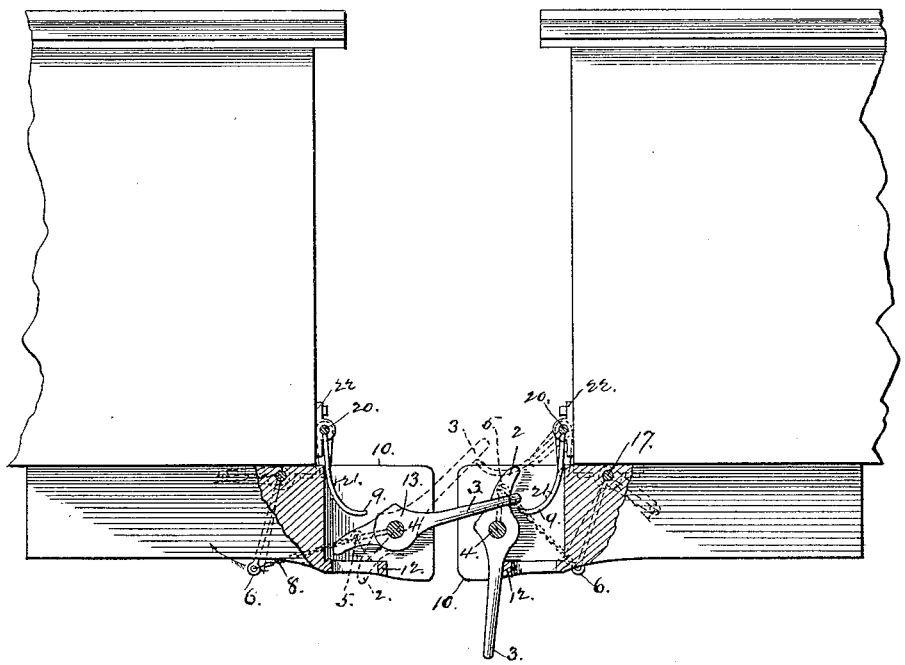
Figure 2:
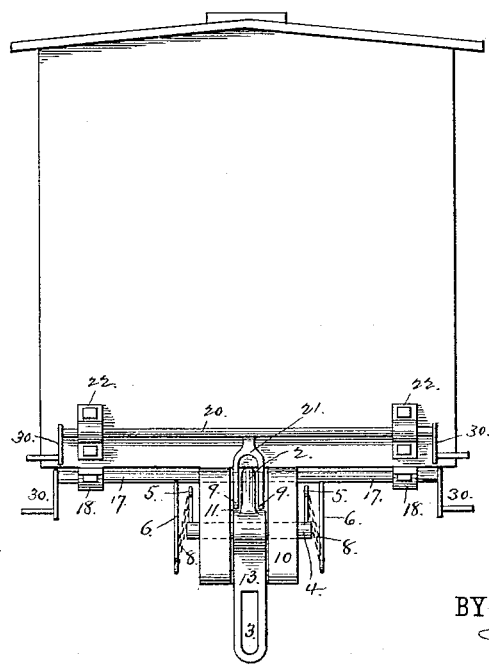

Figure 1 is a side view of a portion of two cars provided with my improved form of car-coupling, the draw-heads being shown in partial central section; and Fig. 2 is an end view of one of the cars, the parts of the coupler being shown in the position represented on the right in Fig. 1.

In the drawings, 10 represents the draw-head, which is formed with a vertical central slot or recess, 11, across which said recess, however, there is arranged a bridge or stop, 12. Within the draw-head there is pivotally mounted a combined coupling hook and link, 13, which consists of a hook, 2, and a link, 3, the hook and the link being made integral, and being rigidly connected to a short shaft, 4, which passes through the draw-head, as best shown in Fig. 2.

To the shaft 4 there are secured arms 5, which arms are connected by chains 8 with arms 6, said arms 6 being rigidly connected to a shaft, 17, that is mounted in proper bearings 18, secured to the under side of the car, as clearly shown in the drawings, the construction being such that when the shaft 17 is thrown so as to move the arms 6 in the direction of the arrows shown in connection therewith the links 3 will be raised or elevated to the position in which they are shown in dotted lines upon the left in Fig. 1. A shaft, 20, carrying a forked arm, 21, is mounted in bearings 22, this forked arm 21 being arranged so that when thrown upward and forward its fingers 9 will pass upon either side of the hook 2. The shafts 17 and 20 are provided with crank-arms 30, as best shown in Fig. 2.

Cars provided with my improved form of coupling are coupled as follows: The combined coupling pin and hook of one of the cars is allowed to occupy the position in which it is shown upon the right in Fig. 1, while the link of the approaching car is elevated to the position in which it is shown in dotted lines in Fig. 1, and as the cars approach the elevated link will drop over the hook of the adjacent car, occupying the position shown in full lines in Fig. 1. To uncouple the cars, the shaft 20 is rotated or turned so as to throw the fingers 9 of the arms 21 forward and upward, and as the fingers so move they will strike against the link 3 and raise it from engagement with the hook 2, this movement of the parts being indicated by dotted lines in Fig. 1.

From the construction described it will be seen that the cars may be coupled or uncoupled without entering the space between the ends of the cars, and consequently all danger to the trainmen is avoided.

Having thus fully described my invention, what I claim as new, and desire to secure by Letters Patent, is—

1. The combination, with a vertically-slotted draw-head having a bridge, of a combined hook and link mounted pivotally within the draw-head, a shaft, 17, having arms 6 and crank-arms 30, and a flexible connection between the arms 6 and the pivotal shaft, substantially as described.

2. The combination, with a vertically-slotted draw head, of a combined hook and link pivotally mounted thereon and operated from the side of the car, a shaft, 20, having a forked arm, 21, and crank-arms 30, substantially as described.

ALBERT H. BOIES.

Witnesses:
 FRANK H. STROUD,
 S. H. FORCE.